United States Patent [19]

Vander Sluis

[11] Patent Number: 5,680,974

[45] Date of Patent: Oct. 28, 1997

[54] ARTICULATING CUPHOLDER ASSEMBLY

[75] Inventor: Daniel R. Vander Sluis, West Lafayette, Ind.

[73] Assignee: Atlantic Automotive Components, Inc., Benton Harbor, Mich.

[21] Appl. No.: 609,785

[22] Filed: Mar. 1, 1996

[51] Int. Cl.⁶ .................................. B60N 3/08; B60N 3/10
[52] U.S. Cl. ..................... 224/281; 224/278; 224/282; 224/926; 296/37.9; 248/311.2
[58] Field of Search ............................. 224/281, 278, 224/282, 483, 275, 926, 539; 248/311.2; 296/37.8, 37.15, 37.9, 37.11; 297/188.14, 188.15, 188.19

[56] References Cited

U.S. PATENT DOCUMENTS

| | | |
|---|---|---|
| 4,087,126 | 5/1978 | Wynn . |
| 4,286,742 | 9/1981 | Pellegrino . |
| 4,453,759 | 6/1984 | Kathiria . |
| 4,708,386 | 11/1987 | Moore et al. . |
| 4,712,823 | 12/1987 | Mills et al. . |
| 4,712,845 | 12/1987 | Nicol ........................ 296/37.9 |
| 4,765,346 | 8/1988 | Simin ......................... 131/231 |
| 4,796,791 | 1/1989 | Goss et al. . |
| 4,826,058 | 5/1989 | Nakayama . |
| 4,848,627 | 7/1989 | Maeda et al. . |
| 4,925,072 | 5/1990 | Masler et al. .............. 224/282 |
| 4,927,108 | 5/1990 | Blazic et al. . |
| 4,953,771 | 9/1990 | Fischer et al. . |
| 4,953,772 | 9/1990 | Phifer . |
| 5,024,411 | 6/1991 | Elwell . |
| 5,044,577 | 9/1991 | Spearman . |
| 5,052,728 | 10/1991 | Fukumoto . |
| 5,072,989 | 12/1991 | Spykerman et al. . |
| 5,096,152 | 3/1992 | Christiansen et al. . |
| 5,104,184 | 4/1992 | Kwasnik et al. ............ 248/311.2 |
| 5,144,963 | 9/1992 | Dabringhaus et al. ........ 131/231 |
| 5,195,711 | 3/1993 | Miller et al. . |
| 5,228,611 | 7/1993 | Yabuya . |
| 5,232,262 | 8/1993 | Tseng . |
| 5,259,580 | 11/1993 | Anderson et al. ............ 224/926 |
| 5,289,962 | 3/1994 | Tull et al. ................. 224/281 |
| 5,520,313 | 5/1996 | Toshihide ................... 224/539 |
| 5,533,772 | 7/1996 | Volkers et al. ............. 296/37.9 |

FOREIGN PATENT DOCUMENTS

| | | |
|---|---|---|
| 4019131 | 2/1991 | Germany . |
| 0102841 | 4/1990 | Japan . |
| 403271032 | 12/1991 | Japan . |
| 403271034 | 12/1991 | Japan . |

*Primary Examiner*—Henry J. Recla
*Assistant Examiner*—Charles R. Eloshway
*Attorney, Agent, or Firm*—Brooks & Kushman P.C.

[57] ABSTRACT

A cupholder assembly includes a housing adapted for mounting in a vehicle, and a cupholder unit comprising a cupholder base for supporting the bottoms of a pair of cups, and a pair of cupholder arms pivotally connected with respect to the base and moveable between an extended position for laterally supporting the cups and a stored position. The cupholder unit is pivotally mounted to the housing for movement between a stored position inside the housing, wherein the arms are retracted, and a use position extended at least partially outside the housing, wherein the arms are extended. The cupholder unit is adapted to receive a cover for covering the cupholder unit when in the stored position. The assembly further comprises an ashtray unit with an ashtray cover pivotally coupled to the housing.

15 Claims, 8 Drawing Sheets

5,680,974

ARTICULATING CUPHOLDER ASSEMBLY

TECHNICAL FIELD

The present invention relates to cupholder assemblies for vehicles, and more particularly to a cupholder assembly which is pivotable between a stored position in a vehicle housing and a use position outside the vehicle housing.

BACKGROUND OF THE INVENTION

It is well known in the art to provide vehicle cupholder assemblies pivotable between stored and use positions in a vehicle. These assemblies are often pivotally secured to the vehicle instrument panel, or are stored within the vehicle console. The assemblies are collapsible for storage and expand when moved to a use position. Unfortunately, such assemblies consume a large amount of functional space in the instrument panel or console. Additionally, such assemblies may not be an aesthetically pleasing addition to a vehicle instrument panel or console.

A further problem with such prior art assemblies is their inability to stabilize larger or taller cups. For aesthetic reasons, it is typically desirable to minimize the size of such an assembly, which compromises its cupholding capacity.

SUMMARY OF THE INVENTION

The present invention overcomes the above-referenced shortcomings of prior art cupholder assemblies by providing a cupholder assembly which includes its own housing and cover for concealing the assembly, the assembly being pivotable between stored and use positions for storing or extending the cupholder arms in order to support a pair of cups.

More specifically, the present invention provides a cupholder assembly which includes a housing adapted for mounting in a vehicle, and a cupholder unit comprising a cupholder base for supporting the bottoms of a pair of cups, and a pair of cupholder arms pivotally connected with respect to the base and movable between an extended position for laterally supporting the cups and a stored position. The cupholder unit is pivotally mounted to the housing for movement between the stored position inside the housing, wherein the arms are retracted, and the use position extended at least partially outside the housing, wherein the arms are extended. The cupholder unit is adapted to receive a cover for covering the cupholder unit when in the stored position.

A preferred embodiment provides a cupholder assembly in which a pair of wing-like cupholder arms are pivotally mounted with respect to the base and pivot to a high position with respect to the cups to be supported for improved lateral cup support.

An alternative embodiment provides a cupholder assembly as described above, further comprising an ashtray assembly including an ashtray bin secured within the housing adjacent the cupholder unit and a second cover pivotally coupled to the housing for pivotal movement between an open position for exposing the ashtray bin and a closed position for covering the ashtray bin. The second cover is positioned closely adjacent the first cover when in the closed position.

Accordingly, an object of the present invention is to provide an improved vehicle cupholder assembly which includes its own housing for storing the collapsed cupholder assembly, and a cover for covering the collapsed cupholder assembly.

A further object of the present invention is to provide a cupholder assembly extendable from a storage housing, and including a pair of wing-like cupholder arms laterally extendable for improved lateral cup support.

Yet another object of the present invention is to provide a cupholder assembly including a housing attachable to a vehicle console without reducing vehicle console bin storage assembly space.

A further object of the present invention is to provide a vehicle cupholder assembly which includes a housing for storing the cupholder assembly when in the collapsed position, and further includes an ashtray bin in the housing.

The above objects and other objects, features and advantages of the present invention are readily apparent from the following detailed description of the best mode for carrying out the invention when taken in connection with the accompanying drawings.

DETAILED DESCRIPTION OF THE PREFERRED EMBODIMENTS

Figure 1:
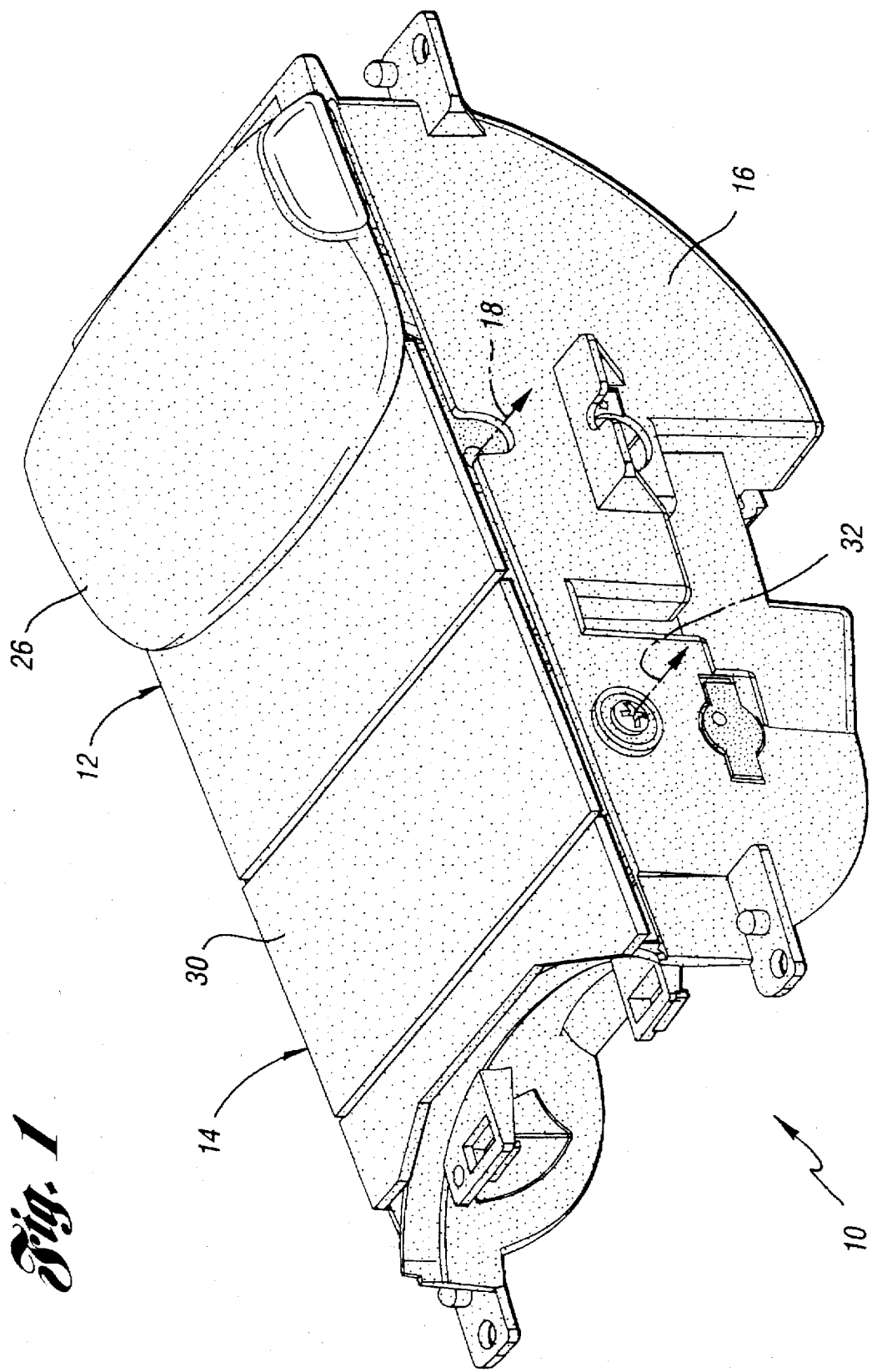
FIG. 1 shows a perspective view of an articulating cupholder and ashtray assembly in accordance with the present invention.
Figure 2:
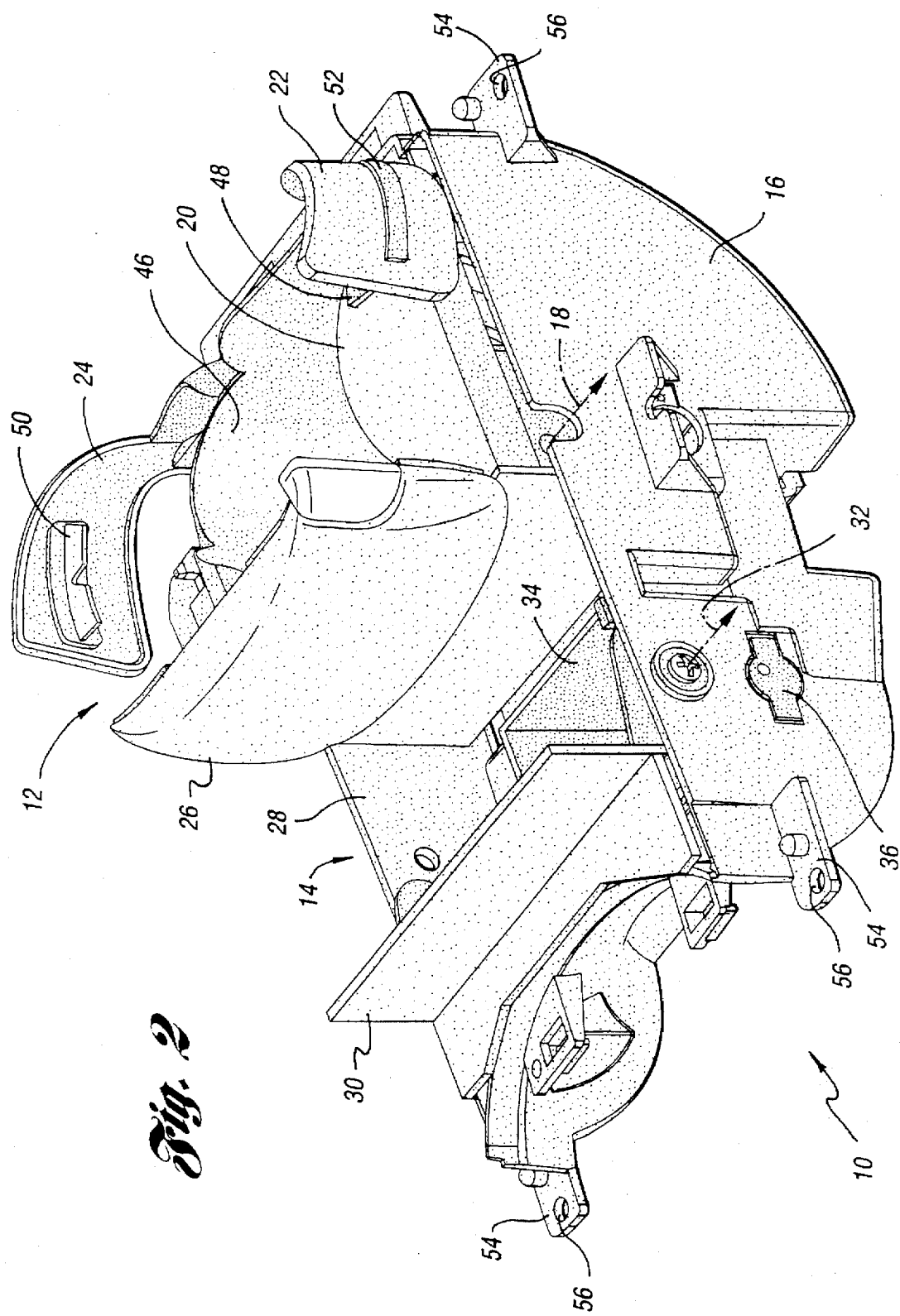
FIG. 2 shows a perspective view of the articulating cupholder and ashtray assembly of FIG. 1 with the ashtray and cupholder in the use position.

FIGS. 1 and 2 show an articulating cupholder and ashtray assembly 10 in accordance with the present invention. The assembly comprises a cupholder unit 12 and ashtray unit 14. FIG. 1 shows the cupholder unit 12 and ashtray unit 14 in the closed or "stored" position, and FIG. 2 shows the cupholder unit 12 and ashtray unit 14 in the open or "use" position.

The assembly 10 comprises a housing 16 adapted for mounting in a vehicle. The cupholder unit 12 is pivotally mounted to the housing 16 along the pivot axis 18. The cupholder unit 12 includes a cupholder base 20 adapted for supporting the bottoms of a pair of cups, and a pair of cupholder arms 22,24 pivotally connected with respect to the base 20. The cupholder arms 22,24 are pivotally movable between an extended position for laterally supporting the cups and a retracted position for storage.

The cupholder unit 12 is pivotally mounted to the housing 16 for movement between a stored position inside the housing, as shown in FIG. 1, wherein the arms are retracted, and a use position, shown in FIG. 2, extended at least partially outside the housing, wherein the arms 22,24 are extended for laterally supporting a pair of cups. The cupholder unit 12 further includes a cover 26 secured to the cupholder base 20 for covering the cupholder unit 12 when in the stored position.

The ashtray unit 14 includes an ashtray bin 28 formed within the housing 16 adjacent the cupholder unit 12, and a second cover 30 pivotally secured to the housing 16 along the second axis 32 for covering the ashtray bin 28. The ashtray bin 28 includes an ashtray receptacle 34 therein. The ashtray bin 28 may also house a cigarette lighter.

Figure 12:
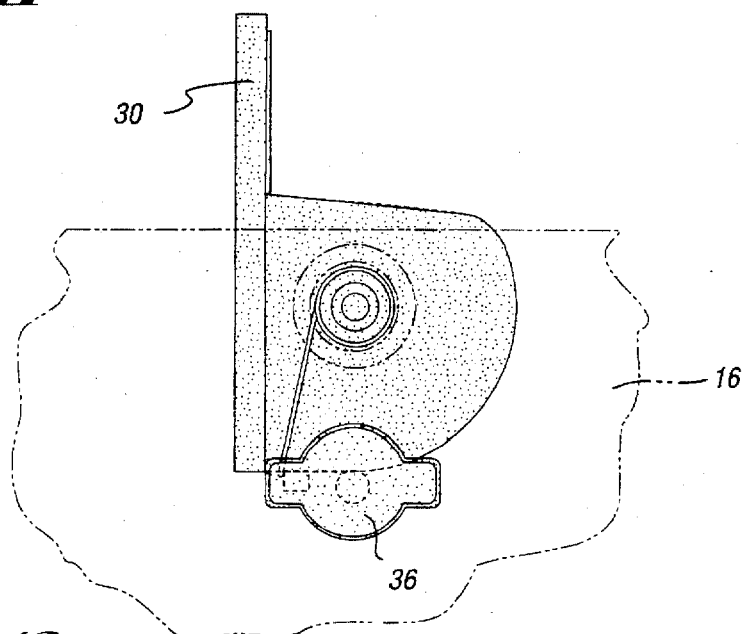
FIG. 12 shows a side view of an ashtray cover and rotary spring for use in accordance with the present invention.

Operation of the ashtray cover 30 is described with reference to FIGS. 7–12. A push-push mechanism, shown in FIGS. 7–12, actuates opening and closing of the ashtray cover 30. A rotary spring 36 biases the ashtray cover 30 toward an open position, as shown in FIG. 12. A cam track 38 and follower 40 are provided for guiding positioning of the ashtray cover 30. The follower 40 is pivotally mounted to the base 16 at the pivot joint 44 to allow pivotal movement so that the follower pin 42 may move along the track.

Figure 7:
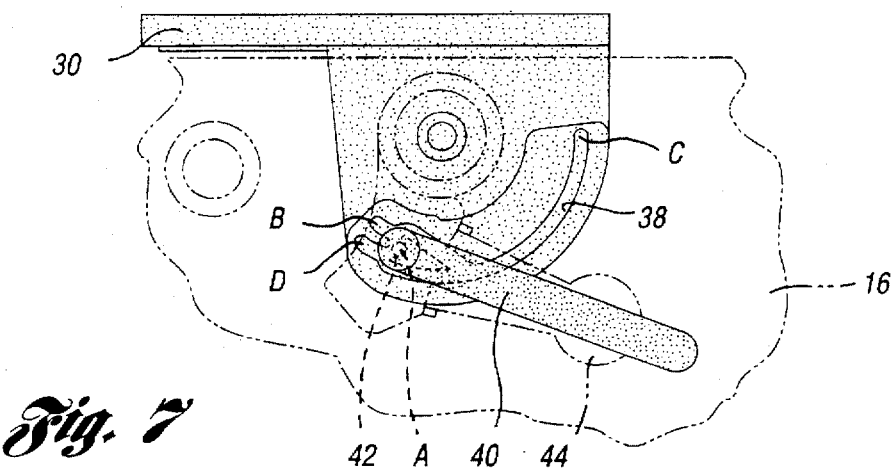
FIG. 7 shows a cut-away side view of a cam track, follower and ashtray cover for use in accordance with the present invention, with the cover in the closed position.
Figure 8:
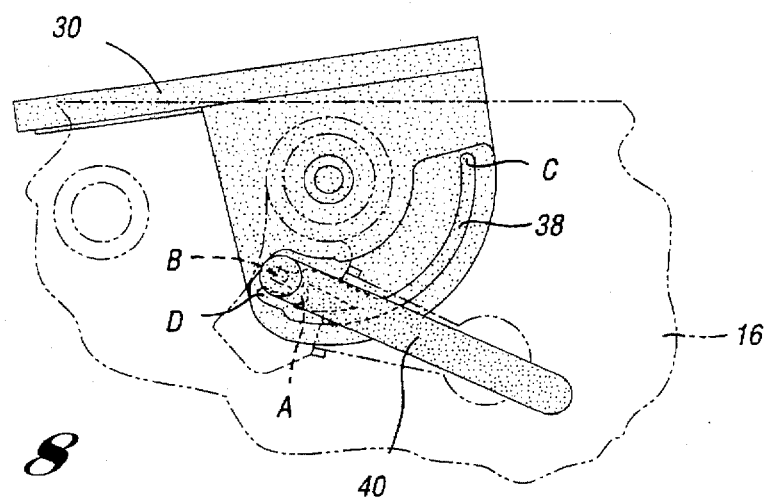
FIG. 8 shows a cut-away side view of the assembly of FIG. 7 with the cover depressed.

With the ashtray cover 30 in the closed position, the follower pin 42 is in position A shown in FIG. 7. In order to open the ashtray cover 30, the user simply presses down on the ashtray cover 30, thus moving the follower pin 42 along the cam track 38 to position B shown in FIG. 8. The user then releases the ashtray cover, and the follower pin 42 travels along the cam track 38 to position C shown in FIG. 9. The rotary spring 36 then holds the ashtray cover 30 in the open "C" position.

Figure 9:
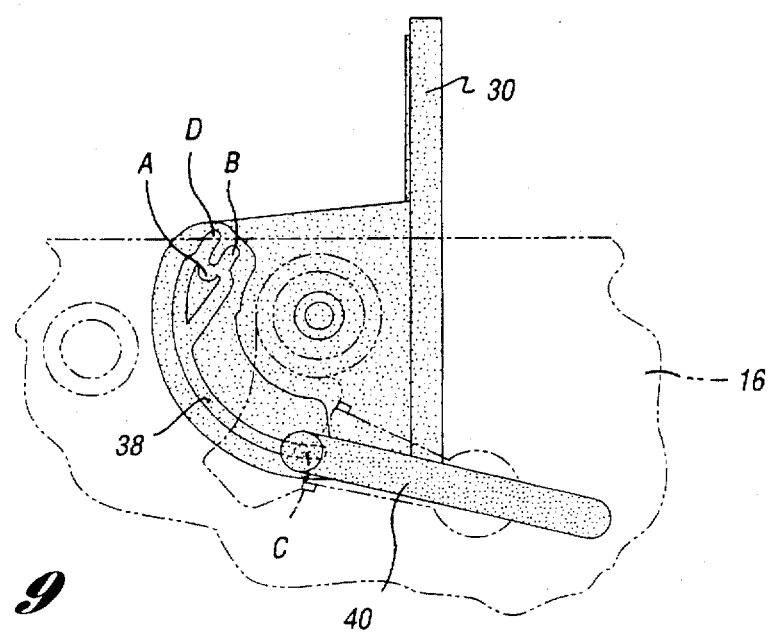
FIG. 9 shows a cut-away side view of the assembly of FIG. 7 with the cover in the open position.
Figure 10:
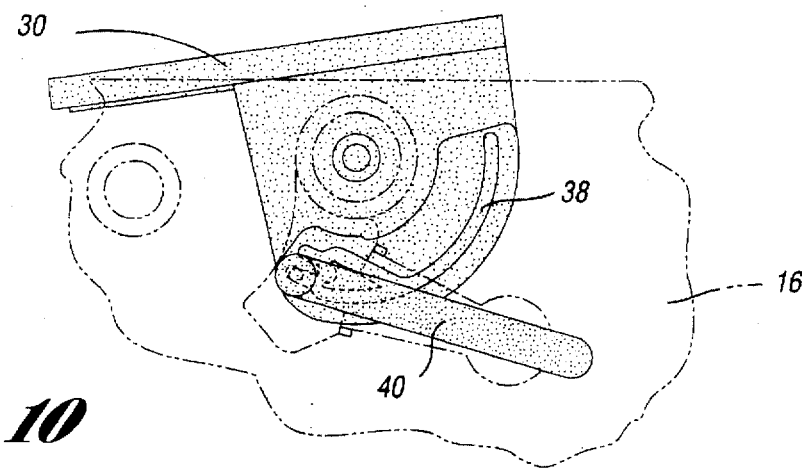
FIG. 10 shows a cut-away side view of the assembly of FIG. 7 with the cover in the depressed position.
Figure 11:
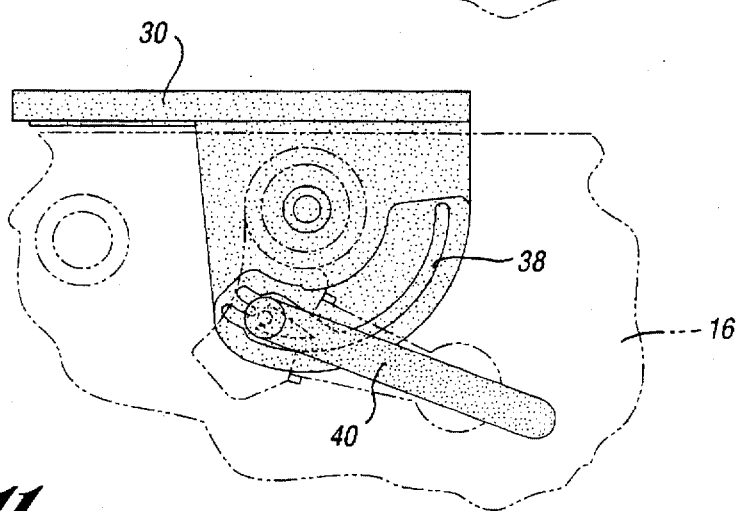
FIG. 11 shows a cut-away side view of the assembly of FIG. 7 with the cupholder in the closed position.

In order to return the ashtray cover 30 to the closed position, the user again depresses the ashtray cover 30 from the position shown in FIG. 9 to the position shown in FIG. 10 so that the follower pin 42 moves to position D. Then, the user releases the ashtray cover 30, and the follower pin 42 returns to position A shown in FIG. 11, and the ashtray cover 30 is again secured in the closed position.

Referring back to the cupholder unit 12, in the use position, as shown in FIG. 2, the cupholder arms 22,24 are extended outward, and the cupholder base 20 is exposed for receiving a cup. The cup is laterally supported by the base wall 46 and the respective cupholder arm 22,24. The cupholder arms 22,24 include rubber bumpers 48,50 for cushioning movement of the cups. The cupholder arms 22,24 further include a felt portion 52 on outer surfaces thereof for alleviating rattles.

As shown in FIG. 2, the housing 16 includes attachment tabs 54 with attachment apertures 56 formed therethrough for securing the housing 16 in a vehicle.

Figure 3:
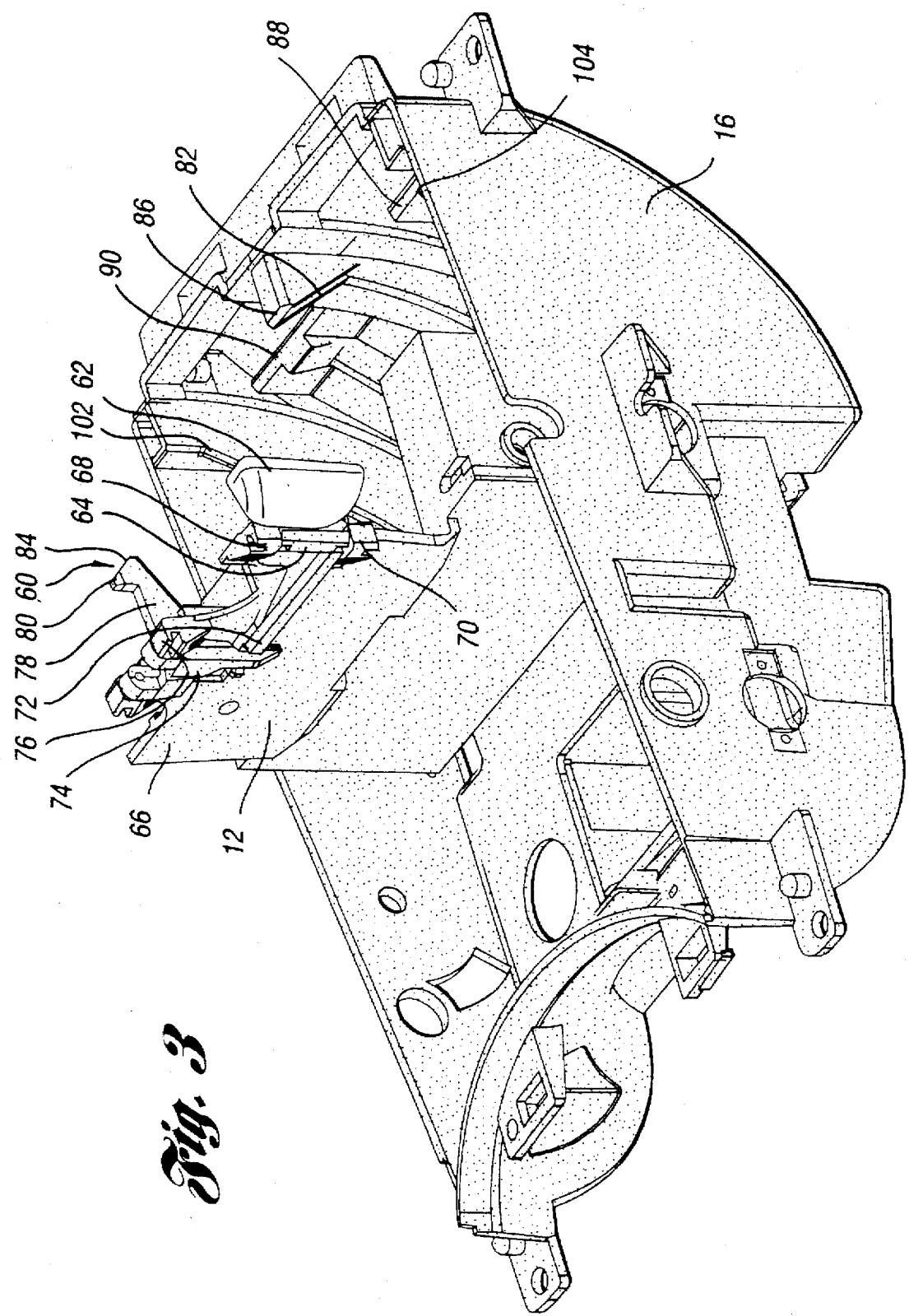
FIG. 3 shows a perspective view of a housing for the articulating cupholder and ashtray assembly of FIG. 1.

Referring to FIG. 3, a locking mechanism 60 is provided for securing the cupholder unit 12 in the closed or "stored" position. The locking mechanism 60 comprises an actuator button 62, which is exposed when the cupholder unit 12 is in the closed position. When the actuator button 62 is depressed, the actuator button rotates the transverse bar 64, which is pivotally connected to the support plate 66 at the pivot joints 68,70. Rotation of the transverse bar 64 lifts the rod 72, which pivots bar 74 about pivot joint 76. Bar 74 is rigidly secured to the latch 78, therefore such rotation causes the tab 80 of the latch 78 to withdraw from the notch 82 formed in the housing 16.

The latch 78 is spring-loaded toward the latched position, such that depression of the button 62 is required to unlatch the tab 80 from the notch 82. The latch 78 includes a sloped lead surface 84 which is engageable with the notch support surface 86 to cause slight retraction of the tab 80 as the cupholder unit 12 is pivoted to the closed position. Upon closing, the spring bias causes the tab 80 to firmly engage within the notch 82 to hold the cupholder unit 12 in the closed position once the tab 80 has cleared the lead surface 84.

Figure 4:
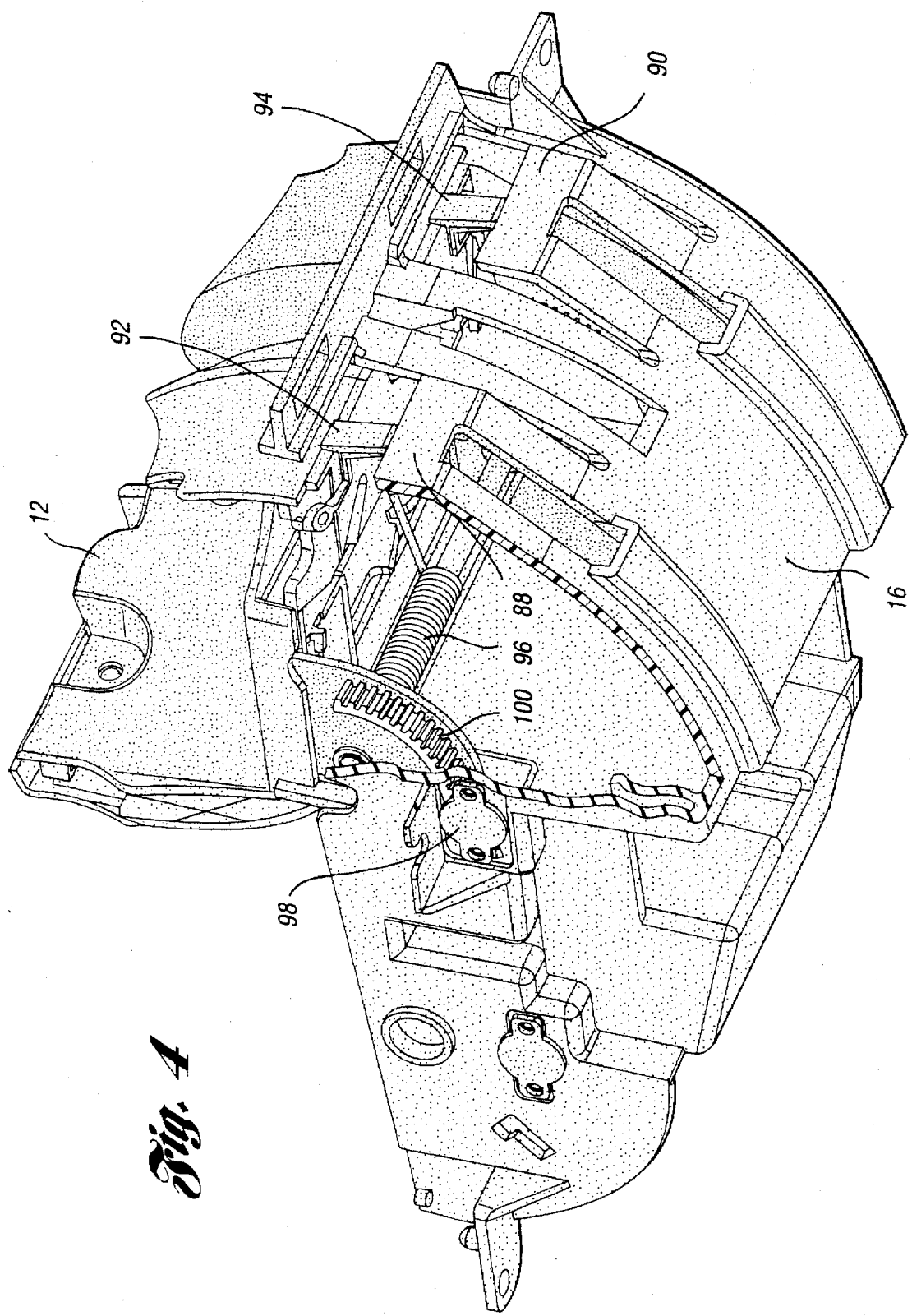
FIG. 4 shows a partially cut-away reversed perspective view of the articulating cupholder and ashtray assembly of FIG. 1.

In order to secure the cupholder 12 in the open position, molded-in spring tabs 88,90 are provided on the housing 16, as shown in FIGS. 3–4, for engagement with the respective detents 92,94 on the cupholder base 20 for securing the cupholder unit 12 in the open or "use" position. In order to move the cupholder unit 12 to the closed position, the user simply presses down on the cupholder unit, thus causing the molded-in spring tabs 88,90 to spring backward to allow clearance for the detents 92,94 so that the cupholder unit 12 may be pivoted to the closed position.

Still referring to FIG. 4, the spring 96 pivotally biases the cupholder unit 12 toward the open position. Movement of the cupholder unit 12 toward the open position is damped by the rotary damper 98, which engages the gear teeth 100 for slowing pivotal movement of the cupholder unit 12. The gear teeth 100 are integral with the cupholder unit 12.

In order to collapse the cupholder arms 22,24, cam surfaces 102,104, as shown in FIG. 3, are formed internally along the housing 16 for engaging and collapsing the cupholder arms. The cam surfaces 102,104 form irregularly profiled ribs which engage and collapse the cupholder arms 22,24 as the cupholder unit 12 is pivoted toward the closed position.

Figure 5:
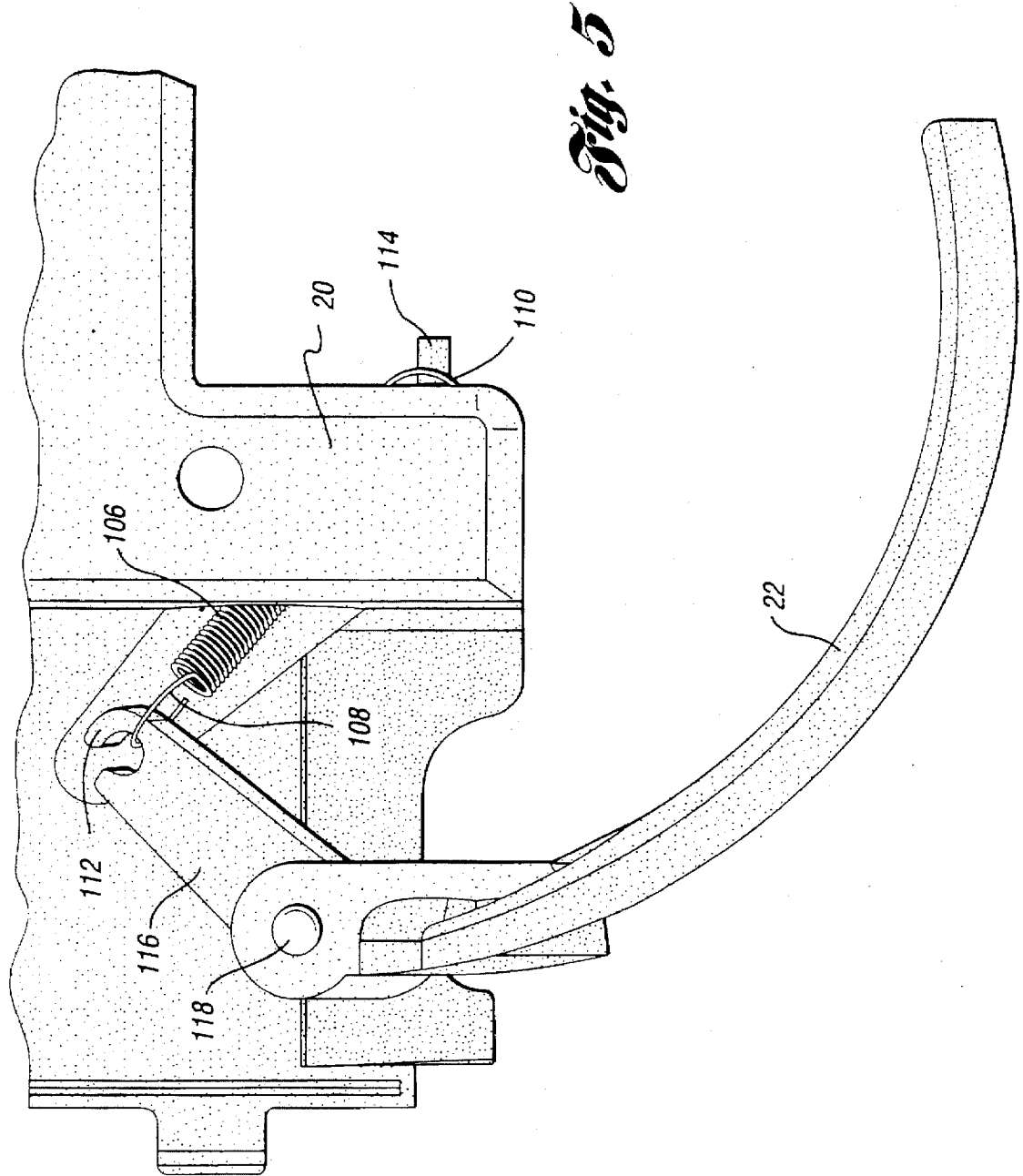
FIG. 5 shows a cut-away perspective view of a cupholder arm secured to the cupholder unit of the present invention.

As shown in FIG. 5, tension springs 106 are secured with respect to both the cupholder base 20 and cupholder arms 22,24 for biasing the arms toward an extended position. The springs 106 include opposing rings 108,110, which engage respective loop portions 112,114 for tensioning the spring. Loop portion 112 is connected to extension member 116 for transmitting rotational movement to the arm 22, which is pivotally connected to the base 20 at the pivot joint 118. Loop portion 114 is secured to the base 20.

Figure 6:
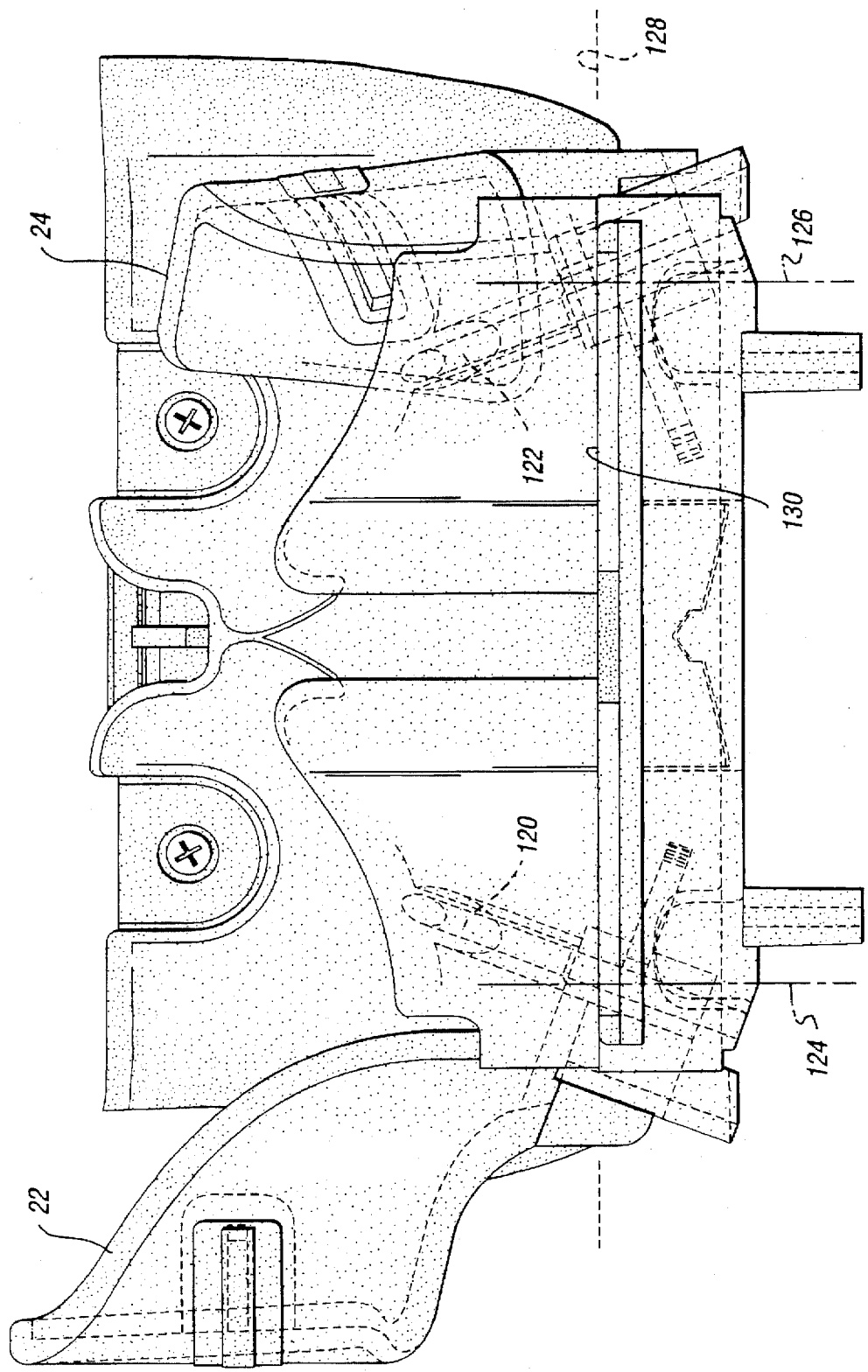
FIG. 6 shows a cut-away side view of a cupholder unit for use in accordance with the present invention.

Turning to FIG. 6, the pivot joint pins 120,122 are tilted with respect to a line 124,126 perpendicular to a plane 128 which is parallel with the cupholder base 20 at the surface 130 where the base 20 supports the cups. With this configuration, pivotal movement of the arms 22,24 toward the open position causes the arms 22,24 to pivot to a high position with respect to the cups to be supported for improved lateral cup support.

While the best mode for carrying out the invention has been described in detail, those familiar with the art to which this invention relates will recognize various alternative designs and embodiments for practicing the invention within the scope of the appended claims.

What is claimed is:

1. A cupholder assembly for a vehicle comprising:
   a housing adapted for mounting in the vehicle;
   a cupholder unit comprising a cupholder base for supporting the bottoms of a pair of cups, and a pair of cupholder arms pivotally connected with respect to said base and movable between an extended position for laterally supporting the cups and a retracted position for storage, said cupholder unit being pivotally mounted to said housing for movement between a stored position inside said housing, wherein said arms are retracted, and a use position extended at least partially outside said housing, wherein said arms are extended;

said cupholder unit being adapted to receive a cover for covering said cupholder unit when in the stored position; and a pair of pivot pins coupled to said cupholder base for pivotally mounting said pair of arms with respect to said base, wherein said pair of pivot pins each are tilted with respect to a line perpendicular to a plane parallel with said cupholder base where said base supports the cups in order to facilitate pivotal movement of the arms to a high position with respect to the cups to be supported for improved lateral cup support.

2. The cupholder assembly of claim 1, further comprising a releasable locking mechanism on said housing for releasably securing said cupholder unit in the stored position.

3. The cupholder assembly of claim 2, wherein said cupholder unit is spring-biased toward the use position.

4. The cupholder assembly of claim 1, wherein said arms are spring-biased toward said extended position.

5. The cupholder assembly of claim 1, further comprising a pair of cams on said housing for engaging said pair of arms, respectively, to retract said arms as said cupholder unit is pivoted from said use position to said stored position.

6. The cupholder assembly of claim 1, further comprising a damper operatively positioned between said cupholder unit and said housing for damping pivotal movement of said cupholder unit with respect to said housing.

7. The cupholder assembly of claim 1, further comprising a detent on one of said housing and said cupholder unit, and a lock member on the other of said housing and said cupholder unit for engaging said detent to releasably secure said cupholder unit in said use position.

8. A cupholder assembly for a vehicle, comprising:

a housing forming a storage compartment therein and adapted for mounting in the vehicle;

a cupholder base pivotally mounted to said housing for movement between a stored position substantially inside said storage compartment and a use position at least partially outside said storage compartment for receiving and supporting a pair of cups;

a pair of wing-like cupholder arms pivotally mounted above said base and movable in a direction upwardly and outwardly from said base whereby said arms move between an extended position for laterally supporting the cups and a retracted position for storage, said arms being spring-biased toward said extended position;

said base being adapted to receive a cover for covering said storage compartment when said cupholder base is in said stored position; and a pair of cams on said housing for engaging said arms to retract said arms as said cupholder base is pivoted from said use position to said stored position.

9. The cupholder assembly of claim 8, further comprising a releasable locking mechanism on said housing for releasably securing said cupholder base in the stored position.

10. The cupholder assembly of claim 9, wherein said cupholder base is spring-biased toward the use position.

11. The cupholder assembly of claim 8, further comprising a pair of pivot pins secured to said cupholder base for pivotally mounting said pair of arms with respect to said base.

12. The cupholder assembly of claim 11, wherein said pair of pivot pins each are tilted with respect to a line perpendicular to a plane parallel to said cupholder base to facilitate pivotal movement of the arms to a high position with respect to the cup to be supported for improved lateral cup support.

13. The cupholder assembly of claim 8, further comprising a damper operatively positioned between said cupholder base and said housing for damping pivotal movement of said cupholder base with respect to said housing.

14. The cupholder assembly of claim 8, further comprising a detent on one of said housing and said cupholder base, and a lock member on the other of said housing and said cupholder base for engaging said detent to releasably secure said cupholder base in said use position.

15. A cupholder assembly for a vehicle, comprising:

a housing forming a storage compartment therein and adapted for mounting in the vehicle;

a cupholder base pivotally mounted to said housing for movement between a stored position substantially inside said storage compartment and a use position at least partially outside said storage compartment for receiving and supporting a pair of cups;

a pair of wing-like cupholder arms pivotally mounted with respect to said base for movement between an extended position for laterally supporting the cups and a retracted position for storage, said arms being spring-biased toward said extended position;

said base being adapted to receive a cover for covering said storage compartment when said cupholder base is in said stored position; and a pair of pivot pins secured to said cupholder base for pivotally mounting said pair of arms with respect to said base, wherein said pair of pivot pins each are tilted with respect to a line perpendicular to a plane parallel to said cupholder base to facilitate pivotal movement of the arms to a high position with respect to the cup to be supported for improved lateral cup support.

\* \* \* \* \*